Nov. 26, 1940.　　　H. G. FERGUSON　　　2,223,002
TRACTOR IMPLEMENT
Filed Nov. 30, 1938　　　2 Sheets-Sheet 1

INVENTOR
Henry G. Ferguson
by　Jno Luuie
atty.

INVENTOR
Henry G. Ferguson
by
atty.

Patented Nov. 26, 1940

2,223,002

UNITED STATES PATENT OFFICE 2,223,002

TRACTOR IMPLEMENT

Henry George Ferguson, Belfast, Northern Ireland

Application November 30, 1938, Serial No. 243,287
In Great Britain November 30, 1937

17 Claims. (Cl. 97—50)

This invention relates to tractors and/or agricultural implements for attachment to tractors and having moving parts requiring a drive such as, for example potato diggers, mowers and the like.

Hitherto such implements as potato diggers, for example, which are adapted to penetrate the soil, were driven through the medium of land wheels or whilst having land wheels may have been driven by a power take-off from the tractor. The wheels were also used for regulating the depth and for transporting the implement. When a power take-off was used from the tractor the land wheels were not used to drive the potato digging machinery, but they were used for depth regulation and transport. With either system such implements as potato diggers were heavy and costly to manufacture, and were not adaptable to small fields because they were made as a separate unit from the tractor and trailed behind it, thus making it impossible to reverse the tractor into small spaces without damage to the implement.

In like manner such implements as mowers, which do not penetrate the soil, were similarly carried on wheels and usually driven therefrom, or in some cases, whilst having land wheels, were driven from the tractor by means of a power take-off. These machines were also heavy and complicated in design and costly to manufacture. Where they were made as a separate unit from the tractor they were not easily adaptable to small fields, and where they were made as a unit with the tractor they could not be quickly attached and detached, and required considerable manual labour to raise and lower them on the tractor.

An object of the invention is to provide a tractor upon which an implement such as a potato digger, mower or other implement having moving parts requiring a drive can be closely supported without the use of land wheels on the implement.

A further object is to provide an arrangement allowing free vertical and/or lateral movement of such implement on the tractor and to provide a power take-off transmission for driving said moving parts without impeding said movement.

A further object is to provide a tractor having a power unit for raising and lowering such implements on the tractor and for automatically controlling the working depth of ground-penetrating implements such as potato diggers in accordance with the draft soil pressure on the implements.

In accordance with a further object, for the quick and easy attachment of the type of implements having a moving part or parts requiring a drive I provide attachment means comprising spaced links and a power transmitting shaft or the like all arranged to allow relative vertical and/or lateral movement and such as will greatly reduce the weight and simplify the construction so that manufacturing and operating costs can be reduced. The implements are made to operate as a unit with the tractor, and are easily operated in very small spaces. Furthermore I provide that the implements can be raised or lowered on the tractor with the greatest ease.

Further objects of the invention will be seen from the following specific description.

The invention will now be described by way of example with reference to the accompanying drawings in which:

Fig. 3 is a sectional view on the line III—III of Fig. 1.

Fig. 4 is a sectional view on the line IV—IV of Fig. 1.

Fig. 5 is an elevation looking from the rear on the end cap of the tractor casing and showing a hinged draw bar.

Fig. 6 is a corresponding side elevation.

Fig. 7 is a sectional view of a modified pump arrangement.

Figure 1:
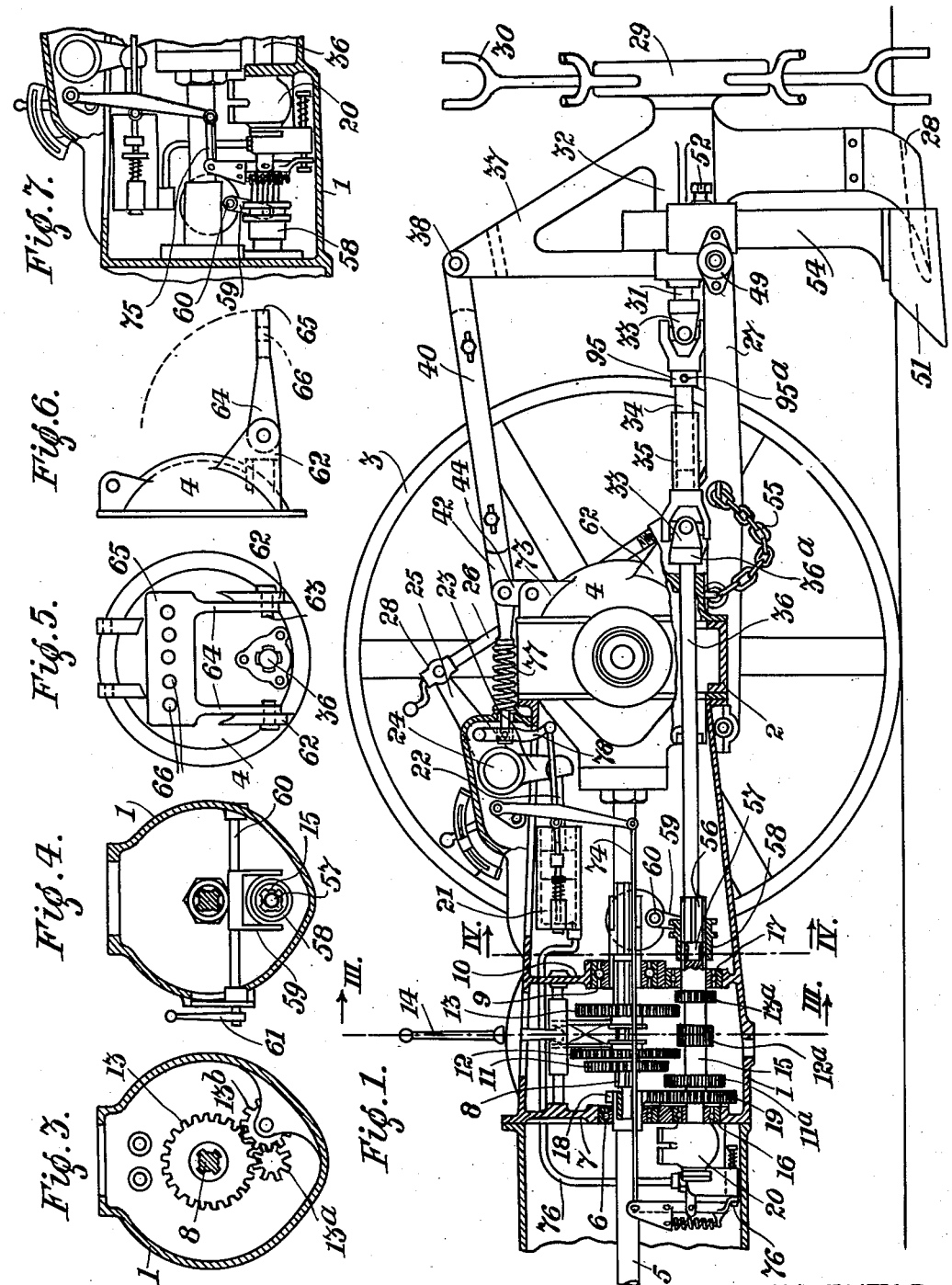
Fig. 1 is a part sectional elevation of a tractor with a potato digger attached thereto.

Referring to the drawings, the numeral 1 represents the rear casing of the tractor to which is attached a housing 2 containing a straight or spiral bevel gear and a differential gear (not shown) for imparting the drive to the traction wheels 3. An end plate or cap 4 is in turn attached to the housing 2.

The casing 1 contains a variable speed gear consisting of an engine-driven primary shaft 5 mounted at its end in a bearing 6 in the partition 7. The shaft 5 is socketed at the end to provide a bearing for an independently rotatable third motion shaft 8 supported intermediate its length on a bearing 9 in the partition 10, said shaft 8 driving the straight or spiral bevel gear and differential gear abovementioned. Spur gear wheels 11, 12 and 13 are slidably mounted on the shaft 8 and adapted to engage in known manner under control of the gear lever 14 with corresponding spur wheels 11ª, 12ª and 13ª on the second motion or lay shaft 15 to give different forward gear ratios and reverse drive. As shown more clearly in Fig. 3 the reverse drive is obtained from the wheel 13ᵃ which engages an idler wheel 13ᵇ which in turn engages the wheel 13.

The second motion or lay shaft 15 is mounted in the bearings 16 and 17 and is constantly driven through a reduction gear consisting of spur wheels 18, 19 from the primary shaft 5.

Mounted on the inner end of the shaft 15 and constantly driven thereby is an oil pump 20 which forms part of an arrangement for hydraulically raising and lowering the implement and also for automatically controlling the depth of cut of the implement in accordance with the draft pressure. The hydraulic control arrangement operates on the general principle set forth in my prior Patent No. 1,687,719 and is constructed and arranged as set forth in my prior Patents Nos. 2,118,180 and 2,118,181. It is therefore not necessary to describe in detail the hydraulic control arrangement and it will be sufficient to note that 21 is an hydraulic ram whose connecting rod 22 is connected to the arm 23 on the shaft 24 which carries two lift arms 25 connected by adjustable rods 26 to links 27, the upper connection of the rods 26 consisting of universal ball joints 28. It will thus be seen that outward movement of the ram piston will raise the links 27 while inward movement will lower same.

The implement shown is a potato digger comprising the usual share 28 for loosening up the potatoes and the usual rotary digger 29 with fork-shaped digging arms 30 for throwing up the potatoes. The digger 30 is mounted on a driving shaft 31 in the frame 32, said shaft being attachable through a Hooke's joint 33 to a shaft 34 having telescopic driving engagement with a hollow shaft 35 connected by a similar Hooke's joint 33 with a power take-off shaft 36 at the rear of the tractor. The ends of the shafts 31 or 36 or the ends of both are splined to give a quickly attachable and detachable connection with a corresponding socket in the joints 33 after the removal of fixing means, for example, cross pins, to prevent disengagement while in use, and there may be reduction gearing between the shaft 31 and the spinner 29. The frame or body 32 has a vertical projection 37 forked at the top to receive the pin bearing 38 for a ball member 39 on which is universally mounted the end of a link 40 and a retaining plate 41. A further link 42 is attached by bolts and slots to link 40 thus forming a composite upper link of adjustable length, the link 42 being similarly attached by the universal joint 43 to the links 44 pivoted on lugs 73 on the end plate 4 and to the draft-sensitive element 45. The frame 32 has also a transverse sleeve 46 adapted to receive a transverse shaft 47, the reduced ends of which are adapted to form bearings for balls 48 on which the ends of the lower laterally spaced links 27 are universally attached by plates 49. In a similar manner the inner ends of the links 27 are universally attached to the ends of lateral projections 50 under the casing 1.

It will thus be seen that the implement is adapted for three point universal connection to the tractor through the upper composite link 40, 42 and the lower laterally spaced links 27. This connection is in accordance with my prior Patent No. 1,464,130 the forward convergence of the link 40, 42 with respect to the lower links 27 creating a line of draft on the implement tending to keep the latter in the ground. The connection is also in accordance with my prior Patent No. 1,916,945, the links 27 being forwardly convergent so that their axes, if produced, would meet at a point at, or about, the front axle of the tractor. As a result of this arrangement of linkage, the implement and tractor function as if the implement were attached at said point, and consequently should the tractor be turned to the left or the right, the implement is immediately turned in the same direction.

Owing to the convergence of the links 27 the implement does not swing with a parallel movement and the outwardly swinging side approaches the tractor relatively more than the other side which recedes relatively from the tractor. In order to minimise the consequent increase or decrease in length of the composite driving shaft 34, 35 the power take-off shaft 36 and the driving shaft are centrally located. This arrangement has the further advantage that the rotatable driving shaft 34, 35 is protected by the links 27 and also by the links 40, 42 from causing damage or being damaged by coming into contact with any object. Further, the links 40, 42 prevent the operator from falling on to the shaft 34, 35 should the seat break, this not being an infrequent occurrence with certain types of seats.

The potato digger is also provided with guiding means to give an automatic self centering effect as set forth in my pending application No. 121,878 of 22nd January, 1937. This means consists of a fin 51 having a vertical, resilient stem 54 near the rear thereof, said stem being secured by a set screw 52 in a slot 53 in the frame 32, this arrangement permitting vertical adjustment of the fin 51. Owing to the resilience and disposition of the stem 54 the fin is capable of deflection about an axis near the rear thereof and so gives the automatic steering or self-centering effect described in the said pending application.

Chains 55 are provided which are connected to the bottom of the end cap 4 and to the links 27 as shown. When the implement is in the working position as shown in Fig. 1, the chains 55 are slack and thus permit a limited amount of lateral swinging movement of the implement. When, however, the implement is raised the chains are straightened out and automatically centre the implement with respect to the tractor and reduce or eliminate lateral swinging movement of the implement and at the same time restrict or eliminate further upward movement of the implement with reference to the tractor.

The power take-off shaft 36 is splined at the inner end 56 and is formed with a reduced part 57 rotatably engaging in the recessed end of the lay shaft 15 which is similarly splined. The said shafts 15 and 36 are engageable and disengageable by means of a sliding splined collar 58 operable in usual manner by a fork 59 mounted on a transverse shaft 60 (Fig. 4) which is operable by a hand lever 61 located at the side of the casing 1. It will be seen that as a result of the shaft 15, being in constant engagement with the engine shaft 5, it is possible to obtain a constant ratio drive for the power take-off shaft 36 as long as the engine is running and irrespective as to whether the tractor is in gear or not. The same applies to the pump 20.

The outer end of the shaft 36 is also splined as above described or similarly adapted to have a driving, slidable connection with the coupling element 36ᵃ of the Hooke's joint. Thus the telescopic shaft 34, 35 can be readily engaged with or disengaged from the shaft 36 when attaching or detaching the implement.

As shown more clearly in Figs. 5 and 6 the end cap 4 has two apertured lugs 62 to which a draw bar device is pivotally attached by pins 63. The device comprises two apertured arms 64 having a transverse interconnecting bar 65 with a series of holes 66 therein for the attachment of a drawbar. When not required this device can be hinged upwardly into the position shown in Fig. 5 and catch or other means for holding it in this position may be provided. The device may be used for hauling carts or implements or the like which have to be kept clear of the tractor wheels 3. It will be seen that the hinge axis of the device is in alignment with the front universal joint 33.

Figure 8:
Fig. 8 is a plan view of the end cap showing a belt pulley attachment.

As shown in Fig. 8 the lugs 62 may also be used for the attachment of a device adapted to be operated by the power take-off shaft 36. The device shown in Fig. 8 consists of a belt pulley 67 mounted in a casing 68 containing bevel or worm gearing for driving the pulley from the shaft 69 which is adapted for slidable driving engagement with the splined end of the power take-off shaft 36. The casing 68 has apertured lugs 70 for engagement with the lugs 62 and has a top projection 71 connected by a pin with a double link 72 which is attached by a pin to the spaced apertured lugs 73 on the top of the end cap 4. The pulley 67 can be used for imparting a belt drive to any machine requiring such drive, for example, to a threshing machine. Obviously the pulley could be replaced by another driving element, for example, by a winding drum for haulage, mole draining or analogous purposes.

As shown in Fig. 1 the pump 20 is located at the inner end of the lay shaft 15 but it will be understood that it may be located on any other suitable part of this shaft or on the power take-off shaft 36 which may be regarded simply as an extension of the lay shaft. For example as shown in Fig. 7 the pump 20 is located on the inner end of the power take-off shaft 36, the coupling sleeve 58 in this case being located between the pump 20 and the lay shaft 15 so that the pump is engageable or disengageable with the layshaft. The arrangement of the hydraulic control mechanism is substantially the same except that the cable 74 (Fig. 1) is replaced by a short link 75 (Fig. 7) and the oil conduit 76 between the pump 20 and the ram 21 is shortened.

As previously mentioned the hydraulic mechanism for raising and lowering the implement and for automatically controlling the depth of operation is the same as that disclosed in my prior Patents 2,118,180 and 2,118,181. It thus embodies the valve 76 located on the suction side of the pump for controlling the admission of oil to the pump and adapted to release the oil from the ram 21 when there is an excess of draft on the implement. As explained in said two prior patents the draft pressure on the implement causes a thrust on the upper link 40, 42 which is transmitted against the resistant spring 77 to the lever 78 which, as described, controls the operation of the valve 76 which is also additionally controlled by the hand lever 18.

The example in the drawings shows a potato digger, which being a ground-penetrating implement, is advantageously subjected to the automatic depth control. It will be understood, however, that implements such, for example, as mowers which do not penetrate the ground may also be connected to the tractor in the manner shown. With such implements there is no substantial draft pressure thereon giving a thrust on the link 40, 42 and thus the automatic depth control arrangement is caused to remain dormant by suitable setting of lever 78 but it will be seen that if the implement meets an obstruction a draft pressure may be created which is sufficient to operate the valve 76 and release the oil pressure, in the manner described in said prior Patents 2,118,180 and 2,118,181. The telescopic shaft is located within the triangular disposition of the links.

Figure 2:
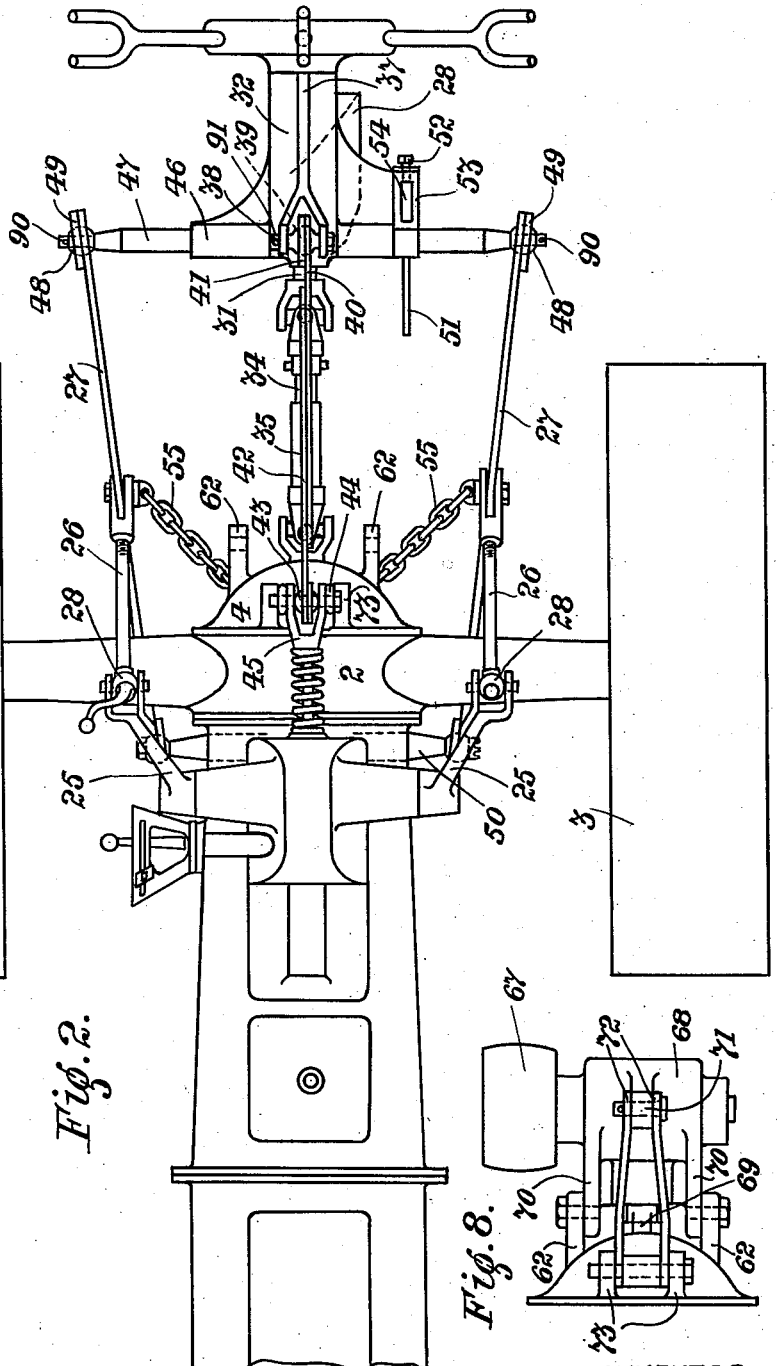
Fig. 2 is a corresponding plan view.

The arrangement shown provides for rapid attachment and detachment of the implements. For example, to detach the implement shown it is only necessary to remove the split pins 90, 91 (Fig. 2) whereupon the links 27 can be slid off the shaft 47 and the pin 38 can be withdrawn, thus completely detaching the implement.

A safety device is provided in the power take-off to prevent damage, as for example, when the driven element or elements of the implement strikes an obstruction. In the example shown this device takes the form of a shearing pin 95a between the shaft 34 and the sleeve 95 of the Hooke's joint, but may be a safety clutch or equivalent device.

The invention has been described with reference to a potato digger but it will be understood that any other implement having parts requiring a drive can be used, for example, a mower, there being, if necessary, gearing in the implement to impart the necessary rotary or oscillating movement, which gearing if necessary will include any convenient means for converting rotary motion into reciprocating or oscillating movement.

In the following claims the word "flexible" as applied to the telescopic or equivalent shaft is to be understood as also including a shaft as shown, that is a rigid shaft deriving flexibility from universal joints therein.

What I claim is:

1. In a tractor for agricultural implements including a prime mover, traction wheels, a variable speed gear between said prime mover and traction wheels and having a second motion or layshaft in constant engagement with the prime mover, and a pressure-fluid-operated unit for raising and lowering the implement and having a pump for the fluid; a power take-off driven by said layshaft and a driving connection between said pump and layshaft, the power take-off and pump being driven so long as the prime mover is running and irrespective of whether the tractor is moving.

2. A tractor as claimed in claim 1, in which the pump is mounted on one end of the layshaft and coupling means is provided at the other for connecting the layshaft with a power take-off shaft.

3. In combination a tractor including a prime mover, traction wheels and a variable speed gear between the prime mover and the wheels, an implement including movable members adapted to be driven, and means for attaching the implement to the tractor comprising laterally spaced links, universal means for attaching the links to the implement and tractor so that the links converge forwardly and the implement closely follows the steering of the tractor, a further link vertically spaced from the first links and forwardly convergent thereto to create a line of draft tending to keep the implement in or on the ground, universal means for connecting said link to the implement and the tractor, the arrangement permitting vertical and lateral movement of the implement with reference to the tractor, a power take-off shaft located within said laterally spaced links, and a flexible telescopic coupling for connecting said shaft and movable member without hindering said vertical and lateral movement of the implement and located within said laterally spaced links to minimise variation in the length of said coupling due to lateral swinging of the implement and to protect the coupling against striking any object.

4. The combination as claimed in claim 3, in which said gear comprises a primary shaft driven by the prime mover, a centrally located layshaft in constant engagement with the primary shaft, and the power take-off shaft and coupling are in alignment with said layshaft so that the coupling is centrally located within the laterally spaced links, and clutch means is provided for detachably connecting the layshaft and power take-off shaft.

5. A tractor having a power take-off shaft, means on said shaft at the rear of the tractor for the attachment of a universally jointed shaft, spaced attachment means at the rear of the tractor, and a drawbar device pivotally connected to said means so as to be capable of vertical movement about a horizontal axis substantially in lateral alignment with a universal joint of said jointed shaft said device having means spaced rearwardly of said axis to provide a laterally pivotal connection for an implement.

6. In combination a tractor, an agricultural implement, and hitch means for detachably connecting the implement to the tractor, the implement comprising movable working members and a drive-obtaining element for driving same and triangularly spaced attachment means; the tractor comprising an engine-driven primary shaft, traction wheels, a variable speed gear between said shaft and wheels, a second motion or layshaft in said gear in constant engagement with said primary shaft, a power take-off shaft in alignment with the layshaft and extending to the rear of the tractor, clutch means for coupling the inner end of the power take-off shaft to the layshaft and a drive-imparting element at the outer end of the power-take-off shaft, an hydraulic power unit for raising and lowering the implement on the tractor including a pump driven by the layshaft and triangularly spaced attachment means at the rear of the tractor, and said hitch conection comprising an upper link and two lower spaced links universally connected by said attachment means to the tractor and implement, which attachment means is so spaced that the links are forwardly convergent and the implement is capable of vertical and/or lateral movement with reference to the tractor and a telescopic transmission shaft connecting the said drive-imparting and drive-obtaining elements and including at least two spaced universal joints thereon to permit of said movement.

7. A combination as claimed in claim 6, in which said transmission shaft comprises a safety element adapted to yield under a predetermined load.

8. The combination as claimed in claim 6, in which stop means is provided between the tractor and the lower links to limit the lateral and vertical movement of the implement and to centre the implement on the tractor when raised to the upper limit.

9. In combination a tractor, an implement such as a potato digger, mower or the like, and a hitch and power drive connection for detachably connecting and entirely supporting the implement on the tractor without the necessity of land wheels on the implement, the tractor comprising an engine-driven primary shaft, a variable speed gear box including a layshaft at the bottom, reduction gearing constantly connecting same with the primary shaft, a third motion shaft in alignment with the primary shaft, slidable variable forward and reverse drive gear wheels between the layshaft and the third motion shaft, traction wheels, bevel and differential gearing between said third motion shaft and the traction wheels, a power take-off shaft in alignment with the layshaft and passing to the rear of the tractor, slidable clutch means between the layshaft and power take-off shaft and a splined rear end on the power take-off shaft, a power unit on the tractor for raising and lowering the implement including a pump, the pump being located on the forward end of the layshaft and an end cap comprising two upper closely spaced apertured lugs an dtwo lower wider spaced apertured lugs; the implement comprising a frame bearing a shaft with a slidable engagement clutch element thereon, a rotary or reciprocating working element connected to said shaft, upper lug means to receive a pin adapted to carry a ball member, a lower cross shaft with reduced ends to slidably receive ball members and a socket to receive the resilient stem of a ground-engaging fin projecting forwardly of the stem; the hitch connection comprising an upper longitudinally adjustable link having ball members at the ends respectively supported on said implement upper lug means and on the closely spaced lugs on said end-cap, two laterally spaced links having ball members at the ends supported on the reduced ends of said cross shaft and on lateral projections on the tractor, a chain connecting each of said last mentioned links with the tractor and a power transmission shaft having end clutch elements slidably engaging the clutch elements on the power take-off shaft and the implement, two universal joints on said transmission shaft, a telescopic part thereon and a shearing pin on said power transmission shaft.

10. A tractor for the attachment of an agricultural implement including movable working elements, comprising in combination at the rear thereof, three substantially triangularly spaced attachment elements for the universal attachment of hitch links, and a power take-off located within said triangularly spaced elements.

11. An agricultural implement for attachment to a tractor which includes a power take-off, said implement comprising three triangularly and laterally and vertically spaced members for the universal attachment of hitch links, movable working means and a drive-obtaining element connected to said means for detachable connection with the power take-off and attachment means for a ground-engaging steering fin.

12. An agricultural implement for attachment to a tractor which includes a centrally or substantially centrally located power take-off, said implement comprising three triangularly and laterally and vertically spaced members for the universal attachment of hitch links, a movable working member and a drive-obtaining element connected to said member for detachable connection with the power take-off, said element being located centrally or substantially centrally within parallel longitudinal vertical planes containing the laterally spaced members for the attachment of the hitch links.

13. An agricultural implement as claimed in claim 12, in which said drive-obtaining element is located on the central vertical plane within the triangularly spaced members.

14. The combination as claimed in 6, comprising control means for the power unit connected with the implement and sensitive to variations in the draft of the implement from a predetermined normal magnitude and causing the power unit to function on the occurrence of such draft variations to correct same and consequently the variations in the working depth of the implement.

15. In combination an agricultural tractor and an attachment device, said tractor comprising in combination at the rear thereof three substantially triangularly spaced attachment elements for the universal attachment of hitch links and a rearwardly directed power take-off shaft located within said spaced elements and normally adapted for driving implements such as potato diggers having a driven member or members, and attachment means on the rear of the tractor for attachment of the attachment device; said attachment device comprising attachment means for engagement with the attachment means on the tractor whereby the device is wholly supported on the tractor, a driven element such as a pulley rotatable about an axis out of alignment with the power take-off shaft, a rotatable coupling element supported in engagement with the power take-off shaft by said attachment means, and gearing means between said driven element and the rotatable coupling element.

16. A tractor for the attachment of an agricultural implement including movable working elements, comprising in combination at the rear thereof, three substantially triangularly spaced attachment elements for the universal attachment of hitch links, and a power take-off shaft located within the two parallel longitudinal vertical planes containing the two outer attachment elements.

17. A tractor for the attachment of an agricultural implement, comprising an engine-driven primary shaft, traction wheels, a variable speed drive between said shaft and wheels which comprises a second motion or lay shaft below said primary shaft and in constant engagement therewith, a third motion shaft in axial alignment with said primary shaft, a differential gearing between said third motion shaft and traction wheels, casing means enclosing said shafts and differential gearing and extending to the rear of the tractor, a power take-off shaft in axial alignment with said lay shaft and passing within said casing means and below the differential gearing to the rear of the tractor where it projects through the casing means, and a pressure-fluid operated unit for raising, lowering, and supporting the implement and including a pump for the fluid, said pump being arranged in alignment with and driven from the end of the lay shaft remote from the power take-off shaft.

HENRY GEORGE FERGUSON.